(12) United States Patent
Terho et al.

(10) Patent No.: US 6,507,590 B1
(45) Date of Patent: Jan. 14, 2003

(54) METHOD OF DATA TRANSFER AND DATA INTERFACE UNIT

(75) Inventors: Mikko Terho, Tampere (FI); Jari Hamalainen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 08/889,708

(22) Filed: Jul. 8, 1997

Related U.S. Application Data (63) Continuation of application No. 08/369,074, filed on Jan. 5, 1995, now abandoned.

(30) Foreign Application Priority Data

Jan. 10, 1994 (FI) ................................................. 940093

(51) Int. Cl.⁷ ............................................. H04L 12/66
(52) U.S. Cl. ...................................... 370/466; 370/474
(58) Field of Search ................................. 370/328, 336, 370/337, 338, 347, 349, 465, 466, 467, 474, 355, 357, 360, 389, 392, 412, 470, 471, 446; 455/422, 517; 375/222

(56) References Cited

U.S. PATENT DOCUMENTS

| | | | | |
|---|---|---|---|---|
| 4,905,231 A | * | 2/1990 | Leung et al. | 370/94.1 |
| 4,975,906 A | * | 12/1990 | Takiyasu et al. | 370/85.13 |
| 4,989,204 A | * | 1/1991 | Shimizu et al. | 370/204 |
| 5,159,592 A | * | 10/1992 | Perkins | 370/85.7 |
| 5,345,448 A | | 9/1994 | Keskitalo | 370/95.3 |
| 5,349,630 A | | 9/1994 | Sointula | 379/58 |
| 5,369,501 A | * | 11/1994 | Wilson et al. | 358/407 |
| 5,383,187 A | * | 1/1995 | Vardakas et al. | 370/94.3 |
| 5,396,490 A | * | 3/1995 | White et al. | 370/60 |
| 5,434,854 A | * | 7/1995 | Focarile et al. | 370/60.1 |
| 5,438,565 A | * | 8/1995 | Hemmady et al. | 370/60 |
| 5,440,545 A | * | 8/1995 | Buchholz et al. | 370/426 |
| 5,442,633 A | * | 8/1995 | Perkins et al. | 370/331 |
| 5,446,736 A | * | 8/1995 | Gleeson et al. | 370/85.13 |
| 5,463,628 A | * | 10/1995 | Sorensen | 370/467 |
| 5,483,524 A | * | 1/1996 | Lev et al. | 370/60.1 |
| 5,485,505 A | * | 1/1996 | Norman et al. | 379/58 |
| 5,497,396 A | * | 3/1996 | Delprat | 375/220 |
| 5,512,886 A | * | 4/1996 | Macko et al. | 340/825.07 |
| 5,528,595 A | * | 6/1996 | Walsh et al. | 370/402 |
| 5,533,029 A | * | 7/1996 | Gardner | 370/94.1 |
| 5,596,573 A | * | 1/1997 | Bertland | 370/474 |
| 5,655,001 A | * | 8/1997 | Cline et al. | 370/328 |

FOREIGN PATENT DOCUMENTS

| | | |
|---|---|---|
| EP | 0567217 A2 | 10/1993 |
| FI | 90173 | 9/1993 |
| WO | WO 9204790 | 3/1992 |

OTHER PUBLICATIONS

Fred Halsall; Data communications, Computer Networks and Open Systems, Fourth Edition; Addison–Wesley Publishing Company; pp. 189–198, 237–243, 1996.*

Finnish Office Action dated Dec. 23, 1994 and English Translation thereof App. No.: 940093 Nokia Mobile Phones Ltd.

* cited by examiner

Primary Examiner—Kwang Bin Yao
(74) Attorney, Agent, or Firm—Perman & Green, LLP (57) ABSTRACT

This invention relates w a method of data transfer via a radio telephone network between a LAN (1) and a Mobile Station and to a data interface unit that applies the method. According to the method the LAN's data packets are formed, and the RLP control is stripped away from them, in the LAN-controller that is permanent connected to it; the data is packed into date packets in accordance with a data communications protocol and the data communications data packets are inserted into data frames of the radio telephone network when the data is transferred between the radio telephone units. The data interface unit (15) according to the invention is connected to a LAN-controller (14) on the side of the LAN (1). The data interface unit (15) incorporates a digital radio telephone unit (168) and a data adapter (17) for inserting the LAN's date packets into date frames and for extracting the data packets from these data frames when the data is transferred between the LAN and a Mobile Station that is connected to the digital radio telephone network.

14 Claims, 5 Drawing Sheets

METHOD OF DATA TRANSFER AND DATA INTERFACE UNIT

This application is a continuation of application(s) Ser. No. 08/369,074 filed on Jan. 5, 1995, now abandoned.

FIELD OF THE INVENTION

This invention relates to a method for data transfer via a radio telephone network between a Local Area Network (LAN) and a Mobile Station. The invention also relates to a data interface unit that applies the method.

BACKGROUND OF THE INVENTION

A known data transfer device is connected both to a LAN and a telephone network for facilitating data transfer between these two networks. Accordingly, the data transfer device incorporates a modem by means of which data traffic coming from the LAN and transmitted to a telephone network is coded into a form that is suitable for the network. Conversely, data coming from the telephone network is converted into a form suitable for the LAN by the modem. The telephone network can be a conventional Public Switched Telephone Network (PSTN) or a radio telephone network. The Mobile Station MS, which is located at a given distance from the LAN, incorporates a modem card or a corresponding separate modem device that enables it to make use of the telephone network to set up a connection from the Mobile Station to the LAN and thereby to carry out bidirectional data transfer.

Figure 1:
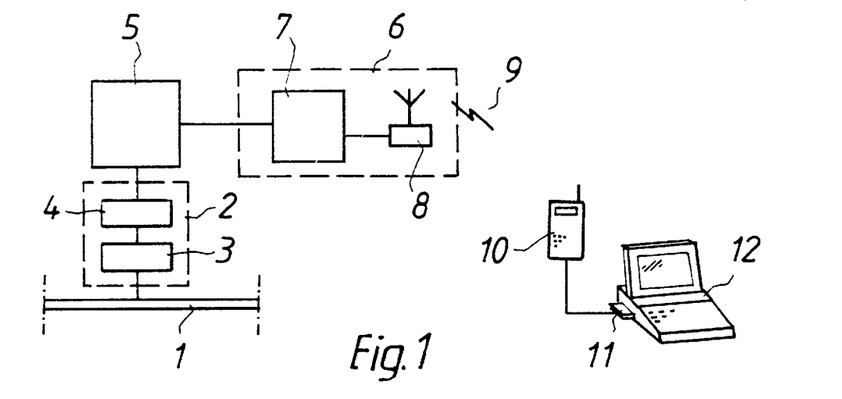
FIG. 1 shows a previously known method of transferring data wirelessly between a Mobile Station and a LAN.

A more detailed description of a conventional method of transferring data between a Mobile Station and a LAN is shown schematically and graphically in FIG. 1. LAN 1 is connected by means of date transfer device 2 to a Public Switched Telephone Network (PSTN) 5. Data transfer device 2 incorporates a LAN-controller 3, by means of which data transfer device 2 is interfaced to LAN 1, and a modem 4, which in turn serves to interface data transfer device 2 to the PSTN 5. PSTN 5, for its part, is connected to radio telephone network 6, ie, to its Mobile Services Centre (MSC) 7 and further on to its base station 8. A bidirectional connection with mobile phone 10 is established through the intermediary of bate station 8 and via radio path 9 and by moans of these intermediaries and modem 11 with Mobile Station 12.

According to a first aspect of the present invention there is provided a method of data transfer for a radio telephone network, comprising extracting data from a data packet, assembling said data into a data structure for a radio telephone network, and transmitting the data structure to a Mobile station; and in a second aspect there is provided a method of data transfer for a radio telephone network, comprising receiving a date structure from a radio telephone network, extracting data from the data structure, and assembling said data into a data packet.

According to a third aspect of the present invention there is provided a data interface unit for data transfer for a radio telephone network, comprising a data interface unit having a data adapter for assembling data from data packets into data frames for a radio telephone system, and, correspondingly, for forming data packets from data frames for extracting data transferred from the radio telephone network.

An advantage of embodiments in accordance with the present invention is that a new method of data transfer between a LAN and a Mobile Station via a radio telephone network has been enabled.

Another advantage is that a new data interface unit for data transfer between a LAN and a Mobile Station via a radio telephone network can be developed.

The invention confers the benefit that the structure of the equipment necessary for date transfer is simpler then the structure of known data transfer equipment. Previously known data transfer equipment generally makes use of modem devices which are subject to type-approval by a competent authority before they can be used. The date interface unit according to the invention must be type-approved only in the radio telephone network in connection with which it is meant to be used. In the method according to the invention or in the data interface unit embodying it, a modem is not used but instead the data is transferred directly via a digital radio telephone network from a Mobile Station to a LAN and vice versa. In this case a fixed telephone network (PSTN) is thus not used and therefore the modem mentioned is not needed. Further, an advantage of the invention is that it makes possible a pan-European mobile telephone system employing a standardized manufacturer-independent digital radio telephone network such as GSM for data transfer between Mobile Stations and LANs. A further advantage of the invention is that via an external radio path a Mobile Station that is in contact with a LAN is apparently direct connected to the LAN by means of a LAN-controller. In addition, it to an advantage that a Mobile Station makes direct use of the operating system and data communications protocol which are needed in dealings with the LAN. Another advantage of the invention is that interfacing of the radio telephone network and a Mobile Station of the LAN is implemented in a data interface unit which in its preferred embodiment is arranged to employ a standard PCMCIA (Personal Computer Memory Card International Association) card.

In a preferred embodiment data packets of a digital packet-switched LAN are formed and stripped in a LAN-controller connected to a LAN; the data which is extracted from the data packets of the LAN is packed into date communications date packets in accordance with a data communications protocol that is known per se when the data is transferred between the LAN-controller and the Mobile Station; the data packets in accordance with the date communications protocol are inserted into data frames of the radio telephone network when the data is transferred between the LAN and a Mobile Station via a digital radio telephone network. The data frames of the radio telephone network can be existing data frames of a time-divided digital radio telephone network or they can be formed appropriately in a predetermined manner.

DETAILED DESCRIPTION OF EMBODIMENTS OF THE INVENTION

Figure 2:
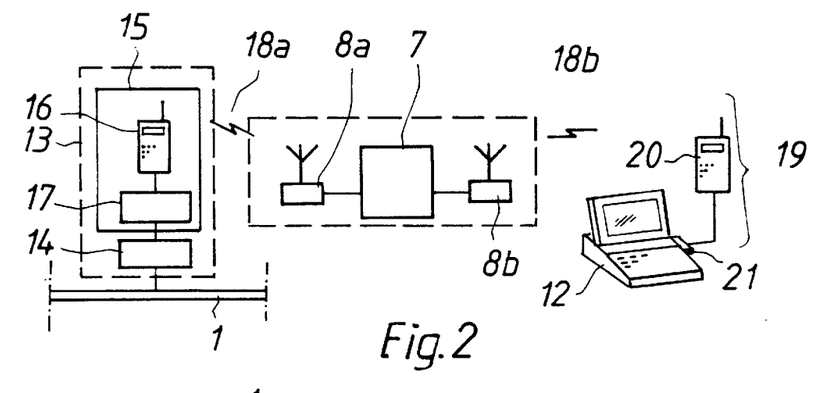
FIG. 2 shows a method, according to the invention, of transferring data wirelessly between a Mobile Station and a LAN.

An embodiment in accordance with the invention, for data transfer between LAN 1 of a radio telephone network 8 and a Mobile Station 12 and the equipment related to it, is illustrated graphically in FIG. 2. Data transfer device 13 incorporates a LAN-controller 14 and a data interface unit 15. Data transfer device 13 is connected to LAN 1 via LAN-controller 14 and by means of data interface unit 15 it is connected to mobile phone network 6. Data interface unit 15 has a separate mobile phone 16 and a data adapter 17. By means of data adapter 17 the functions of LAN 1 and mobile phone network 6 are interfaced to each other during data transfer. Mobile phone 16 is connected via radio path 18a to base station 8a of radio telephone network 6 and from this point onwards via Mobile Services Centre (MSC) 7 and the other base station 8b and other radio path 18b to data interface unit 19 and Mobile Station 12. Data interface unit 19 incorporates a separate mobile phone 20 and a data adapter 21, which replicate the connection of LAN 1 to data interface unit 15. Mobile Station 12 is, for example, a portable personal computer.

During date transfer between LAN 1 and Mobile Station 12 via digital radio telephone network 6, the data packets of LAN 1 are stripped in LAN-controller 14 when the data is transferred from LAN 1 outwards, and the data extracted from the LAN's data packets is formed into new data packets in accordance with a suitable data communications protocol. The new data packets are inserted into data frames of digital radio telephone network 6 within the data interface unit 15 of data transfer device 13 when the data is transferred between LAN 1 and Mobile Station 12 via radio telephone network 6. Correspondingly, data packets which are formed into data frames of radio telephone network 6 in accordance with the suitable data communications protocol are stripped in the data interface unit 15 of data transfer device 13 and the data that is extracted from these data packets is inserted into data packets of the LAN in LAN-controller 14 when the data is transferred from Mobile Station 12 to LAN 1.

The data packets transferred over a radio telephone network conform to a suitable data communications protocol. The data communication protocol used can be, for example, one of the following generally used protocol: IP (Internet Protocol). ISO/OSI CLNP (Connectionless Network Protocol), ISO/OSI CONP (Connection Oriented Network Protocol), DECnet, IPX/SPX and AppleTalk. The data communications protocol used can thus be the same protocol which is used in Mobile Stations that are physically connected directly to the LAN. Thus, a connection can be made from a Mobile Station to various LANs, such as Ethernet (TM) or Token Ring (TM) networks.

An embodiment in accordance with the invention offer the user of a Mobile Station the possibility of being directly in contact with a home LAN or in general with different types of LANs directly via a digital radio telephone network without making use of a PSTN. Accordingly, the Mobile Station does not call for the use of a separate modem or a data transfer device that is connected to the LAN.

Figure 3:
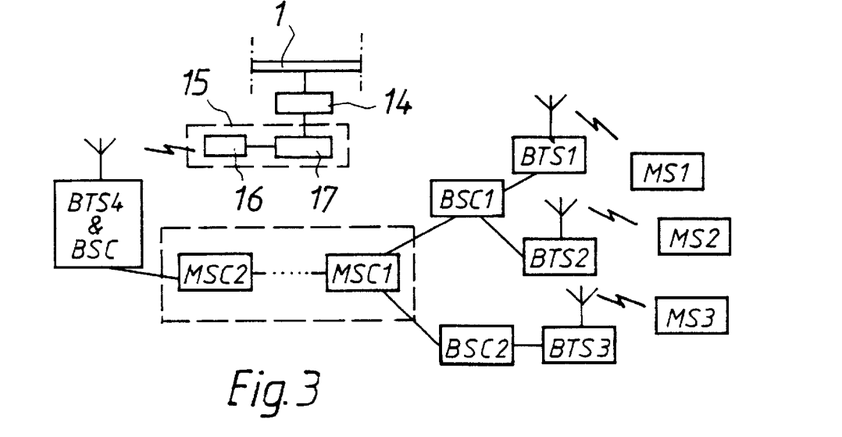
FIG. 3 is a block diagram showing part of a cellular radio telephone network and a LAN that is connected to it by means of a device according to the invention.

A digital radio telephone network 6, suitable for use with an embodiment in accordance with the invention is illustrated graphically in FIG. 3. Radio telephone network 6 comprises a group of mobile stations MS1, MS2, MS3, which are linked via a radio path to base stations BTS1, BTS2 and BTS3. The base stations BTS are linked to base station controllers BSC1, BSC2 and these in turn are linked to a Mobile Services Centre (MSC1). The calls via MSC1 are forwarded to their destinations. On the LAN side, LAN 1 itself is connected to LAN-controller 14 of the data transfer device and this is further connected via data adapter 17 of the data interface unit and mobile phone 18 to radio telephone network 8. Radio phone 16 thus forms a mobile station MS with respect to the radio telephone network, and this MS is in contact via a radio path to base station BTS4 and its base station controller BSC. The base station controller BSC forwards the message to MSC2. Mobile Service Centres MSC1 and MSC2 are in turn in contact with each other via appropriate links.

In digital radio telephone network 6, signals are transferred between Mobile Stations MS1, MS2, MS3 as data packets in accordance with a standard frame structure and protocol. Mobile telephone network 6 may be, for example, a GSM network or a corresponding digital mobile telephone network, such as DCS1800. LAN 1 is also a digital network, such as Ethernet (TM), Token Ring (TM), Fiber Distributed Data Interface or some other LAN. The date interface unit 15 of the LAN, and in particular data adapter 17, is located between LAN 1 and digital radio telephone network 6 and, correspondingly, data interface unit 19 of the Mobile Station, and in particular data adapter 21, is located between radio telephone network 6 and Mobile Station 12. Both data interface units 15, 19 act to adapt the data transfer characteristics of networks 1 and 6 to each other in a simple and efficient manner.

Figure 4:
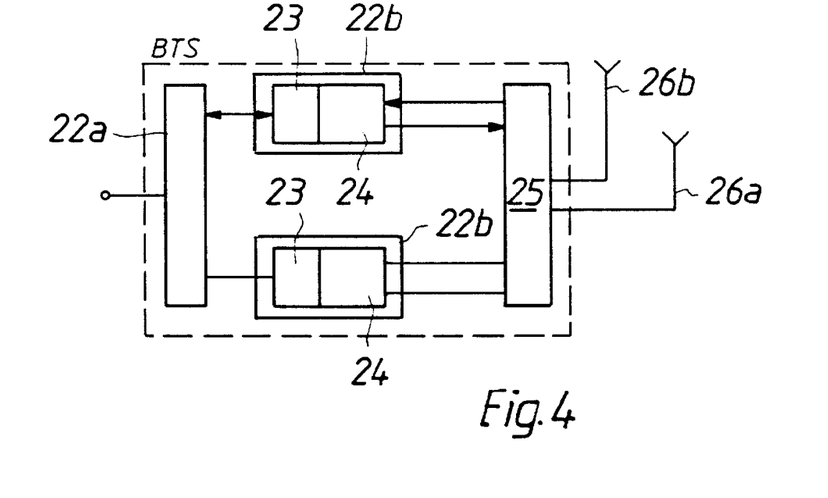
FIG. 4 shows the structure of the base station in the form of a block diagram.

The general structure of the base station BTS of digital mobile telephone network 6 is shown in FIG. 4. Baseband Interconnection Element (BIE) 22a of the base station BTS connects the Base Station Controller BTC to digital PCM link 22b. Part of the channels of the PCM link are reserved for signalling and the remainder of the channels are for data transfer. The digital signals of the PCM link are adapted in frame unit 23 and formed into TDMA frames and channel-coded, interleaved and transmitted as TDMA bursts. The TDMA bursts are modulated in receiver/transmitter unit 24 to the carrier wave frequency and sent via selector 25 and transmission antenna 26a to the radio path. In the opposite direction the modulated TDMA bursts are received from the radio path by receiver antenna 26b and fed via selector 25 and the receiver filters ahead to receiver/transmitter unit 24. In receiver/transmitter unit 24 the signal is demodulated from the carrier wave frequency signal to form a baseband signal and is detection-modulated, deinterleaved and channel-coded in frame unit 23.

Finally the signal is fed from PCM link 22b to Baseband Interconnection Element (BIE) 22a and further to the Base Station Controller BSC.

All the messages to be sent are formed in the Base Station Controller BSC and sent to the radio path via the Base Transceiver Station BTS. All the messages received from the radio path are transferred from the Base Transceiver Station BTS to the Base Station Controller BSC and then on the to Mobile Services Centre MSC (FIG. 3). Via the Mobile Services Centre MSC the messages can be transferred to other Mobile Services Centres, proceeding downwards in the radio telephone network hierarchy. Additionally, messages can also be transferred from the Mobile Services Centre to other networks.

The structure of the mobile phones 16, 20 in FIG. 2 suitable for a Mobile Station. Is shown in block diagram form in FIG. 5. Both normal speech and data can be transferred via a mobile phone of this kind. The mobile phone incorporates an antenna 30, a duplex filter 31 and a radio receiver 32 and transmitter 33. In addition to receiver 32, the receiving part of the mobile phone comprises, in the direction of travel of the signal, an A/D converter 36, a detection-modulation unit 37, a decryption unit 38, a deinterleaving unit 39 and the channel coder 40 of the receiving side. In a similar manner, the transmission side comprises, in the direction of travel of the signal, the transmitter's channel coder 41, an interleaving unit 42, an encryption unit 43, a burst formation unit 44, a GMSK modulation unit 45 and the RF transmitter 33 after this. For speech processing, the mobile phone further comprises a speech coder 46 and microphone 48 that are connected to the transmission side as well as a speech decoder 47 and 8 speaker 49 that are connected to the receiving side. When receiving and transmitting data, the speech processing units are bypassed and the data is fed in through the data input pin DI and extracted through the data output pin DO. The mobile phone furthermore comprises a control unit 35 and a synthesizer-oscillator 34. The functions of the mobile phone are controlled by means of control unit 35 and the synthesizer serves to form the required timing signals and frequencies.

Figure 5:
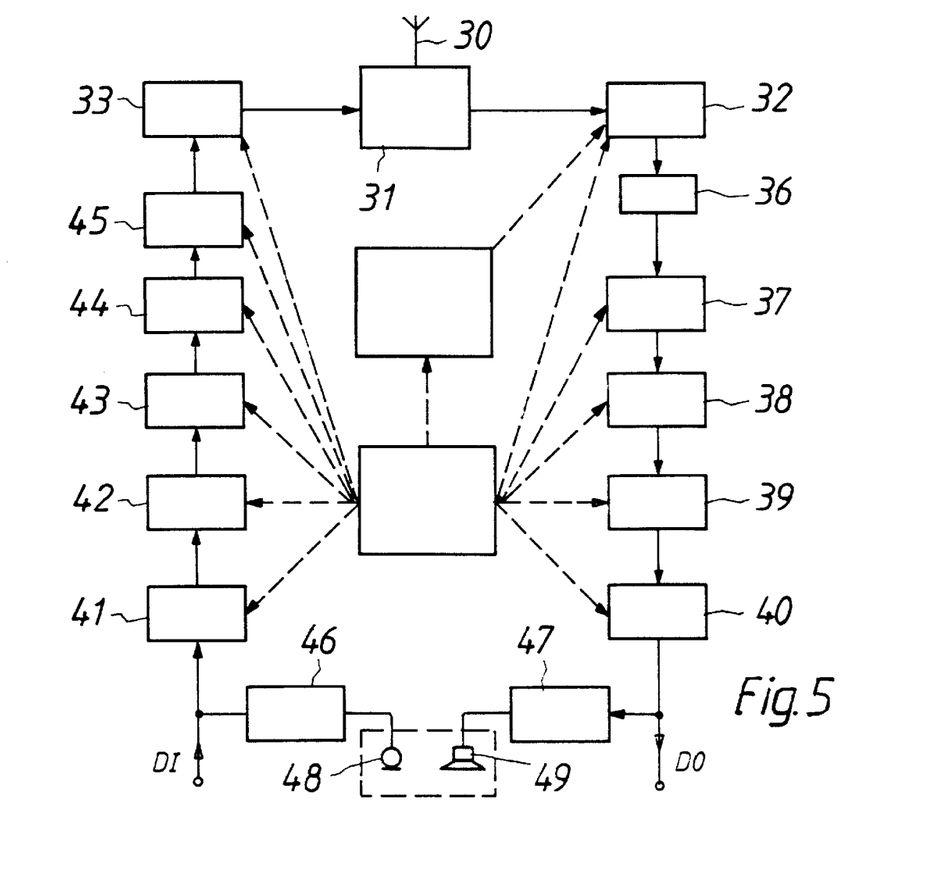
FIG. 5 shows the structure of the mobile phone in the form of a block diagram.

Data is fed into mobile phone 16 via input pin DI from an appropriate data device such as data adapter 17 in FIG. 2. From mobile phone 16 the data is sent to radio path 18a in such a way that it is channel-coded with channel coder 41, interleaved in interleaving unit 42 and subjected to encryption in encryption unit 43. The data that has been processed in the above-described manner is fed into burst formation unit 44 in which the time divided bursts connected with time division channelling are formed. Thereafter the bursts are fed into modulator 45 and then proceed via radio transmitter 33 and duplex filter 31 to antenna 30 and the radio path.

The signal that has travelled via radio telephone network 6 and come in from radio path 18b is received by antenna 30 of the other radio telephone 20 and fed via duplex filter 31 to radio receiver 32 in FIG. 5. From radio receiver 32 the date signal is fed via A/D converter 36 to Detection Modulation Unit 37, where it is time-decoded. Thereafter decryption is carried out in decryption unit 32, the signal is deinterleaved in deinterleaving unit 39 and the channel decoding is performed in channel coder 40, after which the data is fed out through output pin DO of the mobile phone to the data device which is connected to it, such as to data adapter 21 in FIG. 2.

Figure 6A:
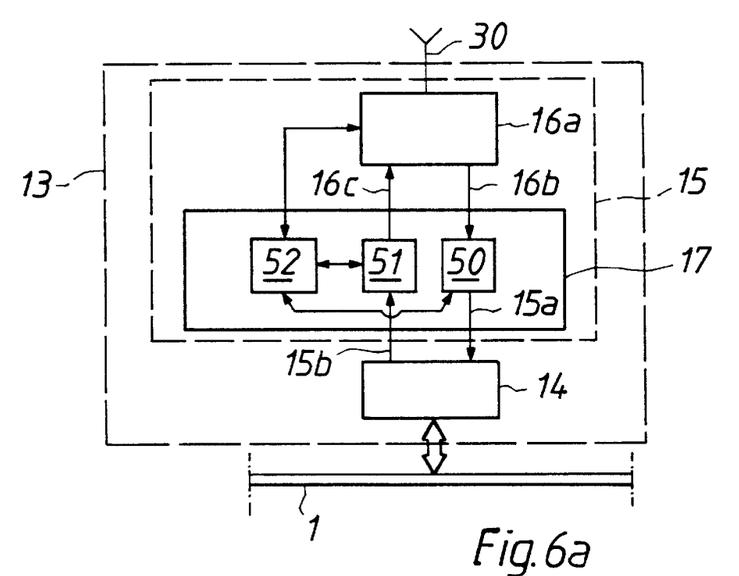
FIG. 6A is a block diagram showing the data interface unit connected to a LAN.

A block diagram of the data transfer device 13 used in connection with LAN 1 is shown in FIG. 6A. A LAN controller 14 that is known per se is connected to LAN 1. Data interface unit 15 is in turn connected via the intermediary of input and output channel 15a, 15b to LAN controller 14. Data interface unit 15 comprises radio telephone unit 16a and data adapter 17. Radio telephone unit 16a is in principle the same as that shown in FIG. 2 and mobile phone 16, which has been described above in connection with FIG. 5. This radio telephone unit 16a nevertheless does not incorporate units required for speech transmission, is, a speech coder, speech decoder, microphone or headset. Radio telephone unit 16a comprises an antenna 30 for transmitting and receiving radio signals.

Data adapter 17 comprises two buffer memories 50, 51 and a controller 52. Buffer memories 50, 51 are connected to LAN-controller 14 via channels 15a, 15b and to the data output pin 16b (DO, c.f. FIG. 5) and data input pin 16c (DI, cf. FIG. 5) of radio telephone unit 16a. Controller 52 serves to direct the data stream coming via output pin 16b of radio telephone unit 16a to LAN-controller 14 via buffer memory 50 and channel 15a and further on to LAN 1. Similarly, the data stream is directed from LAN 1 via LAN-controller 14 and channel 15b to the other buffer memory unit 51 and via input pin 16c to radio telephone unit 16a and further on via antenna 30 to the radio path.

Figure 6B:
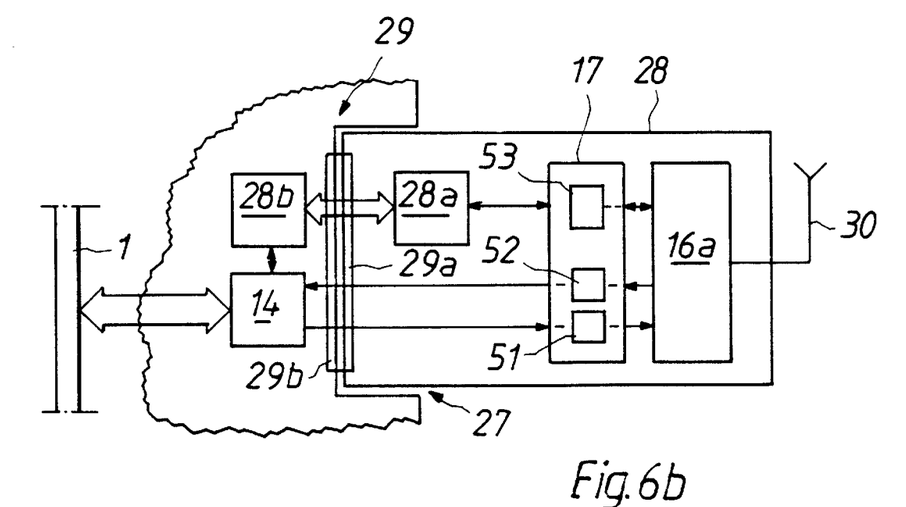
FIG. 6B shows a data interface unit implemented on a PCMCIA card.

Data interface unit 15 according to the invention can be advantageously implemented as a PCMCIA card 28, as is shown schematically in FIG. 6B.

The PCMCIA Connector is the connector standard defined by the Personal Computer Memory Card international Association, or PCMCIA, for a 68 pin connector. PCMCIA has been formed to promote the replaceability of integrated circuit cards in computers end other electronic devices. PCMCIA cards are standardized cards which are suitable for use both as memory cards and expansion cards for peripheral circuits.

Data interface unit 15 of PCMCIA card 28 comprises a data adapter 17 and a radio telephone unit 16a with its antenna 30 (cf. FIG. 6A). In addition to these, PCMCIA card 28 is fitted with service unit 28a, which is connected to PCMCIA card connector strip 29, and with the first connector strip 29a. PCMCIA card 28 is seated in PCMCIA card slot 27, which resides in the host unit in this case LAN-controller 14. PCMCIA card slot 27 incorporates a second connector strip 29b to which the first connector strip 29a of card 28 can be connected. LAN-controller 14 furthermore includes PCMCIA service unit 28b by means of which card 28, which to equipped with units 17, 16a and PCMCIA connector 29, is interfaced to LAN-connector 14.

Data transfer between LAN 1 and radio telephone network 6 and, further on, Mobile Station 12 that is connected to radio telephone network 6 takes place as follows. Mobile Station 12 (FIG. 2), such as a portable microcomputer, has had installed in it data communications software that enables messages to be transmitted and received directly between said LAN and the Mobile Station. The data communications software is of a type that is used with a Mobile Station, such as a computer, that is permanently connected to a LAN by means of a LAN controller. This means that the data communications protocol used in the Mobile Station is, for example, the IP (Internet Protocol) protocol when a connection has been established with a LAN. When a connection is set up from Mobile Station 12, the user dials the number of mobile phone 16 of the data transfer device connected to LAN 1, or of a corresponding radio telephone unit 16a, after which a connection is set up via digital radio telephone network 6 to LAN 1 and further on to the personal computer (not shown in the drawing) or equivalent device that is connected to the LAN.

When a connection has been set up between Mobile Station 12 and the computer of LAN 1, the data transfer can be initiated. Functions related to this are discussed in the following in connection with data transfer device 13 of the LAN (FIG. 6A).

The computer connected to LAN 1 sends date packets that are inserted into the data frames of the time-divided LAN in question along LAN 1 to LAN-controller 14 of the LAN's date transfer device. LAN-controller 14 receives the data packets, strips the Radio Link Protocol (RLP) control away from them and feeds the content of the date block of each data packet via output channel 15b to buffer memory 51 of data adapter 15. By means of controller 52 of data adapter 15 and making use of the data communications software and the data communications protocol that has been adapted to it, the content of buffer memory 51 is read periodically into a data packet in accordance with the data communications protocol and this goes via input pin 16c to radio telephone unit 16a. The data packet of each data communications protocol is inserted into one or more time-divided data frame in accordance with the radio telephone system. The bit Stream coming from LAN 1 in radio telephone unit 16a via LAN-controller 15 and buffer memory 51 is thus processed as normal data and it is packed into one or more data frames in accordance with the RLP of a digital radio telephone system, such as the GSM system, and it is sent in the normal manner via antenna 30 to the radio path.

in the opposite direction with respect to the above, the radio signals and the data stream brought by them are received by data transfer device 13 of LAN 1. Radio telephone unit 16a receives the data packets that have been inserted into the radio telephone system's data frames, such as RLP frames, and these are fed to buffer memory 50 of data adapter 17. By means of controller 52 of data adapter 17 and making use of the data communications software, the data packets in accordance with the data communications protocol are stripped and the content of these data blocks is transferred from buffer memory 50 ahead to LAN-controller 14 in which they are packed into data packets of the LAN and transferred to LAN 1 and via the LAN network to the other personal computer or equivalent that is connected to the LAN.

Figure 7:
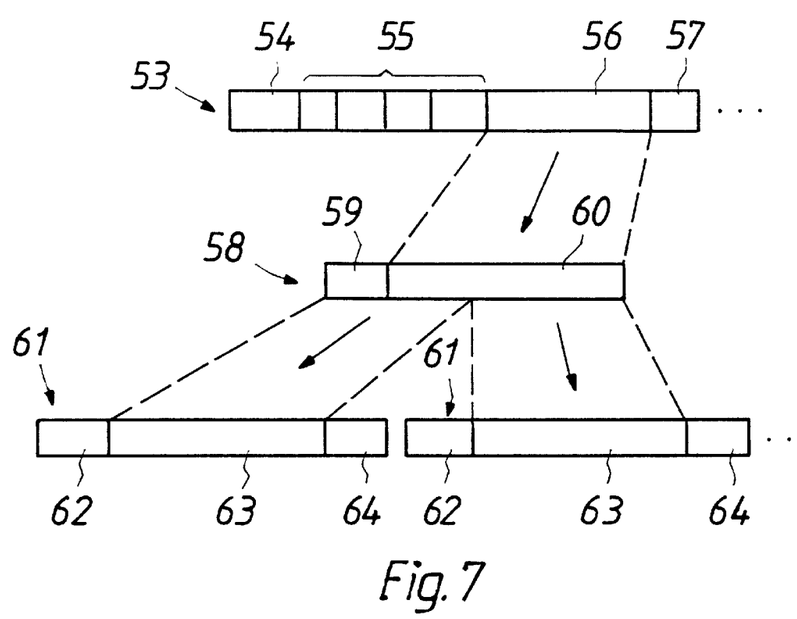
FIG. 7 is a schematic view of how data that is sent from a LAN to a Mobile Station is extracted from the LAN's date packet and then packed into a data packet according to the data communications protocol and then into a frame unit of the digital radio telephone network.

FIG. 7 illustrates how a data block 56 of data packet 53 of an Ethernet (TM) LAN is inserted into a data packet 58 in accordance with a data communications protocol, it then being inserted into one or more RLP frames 61 of a GSM radio telephone network. Data packet 53 of the LAN comprises a preamble 54, a group of Start Frame Delimiters 55 containing, amongst other things, the destination address and source address of the LAN, as well as data block 56 and the Frame Check Sequence 57. The data that is in the LAN or is to be transferred to a LAN is packed into data block 56 of data packet 53. When the data is transferred out from the LAN, data packets 53 of the LAN are stripped and data blocks 56, and their content in particular, are processed in accordance with a suitable predefined data communications protocol, such as the IP (Internet Protocol) protocol, as also illustrated in FIG. 7 as data packet 58. In this case the content of data blocks 56 is inserted into data packets 58 in accordance with the IP data communications protocol and specifically into data block 60 of data packets 58 via the software and under control of the IP data communications program. In its general form a data packet 58 in accordance with the IP data communications protocol comprises a header 59 and data block 60. Header 59 includes, among other things, an identifier field for the version of the IP data communications protocol that is used so that both the sender, recipient and any intermediaries will use IP data packets defined in the same manner in their mutual data interchange.

Header 59 furthermore includes a header length field and a total length field of the IP data packet and IP source and destination address fields. The maximum length of an IP data packet is approx. 65 kbit (IP version 4).

When IP data packets 58 are sent ahead to the radio path via mobile phone 16, each IP data packet 58 is inserted in one or more data blocks 63 of frame 61 according to the radio telephone system's data transfer protocol, such as the radio link protocol RLP of the GSM system or it is divided among several such data blocks. Data frame 61 in accordance with the Radio Link Protocol RLP comprises a 16 bit header, a 62,200 bit data field 63, and a 24 bit Frame Check Sequence 64. Feeding of the user data, ie, data packets 58, to the RPL data frames 61 can take place, for example, according to the GSM L2R (Layer 2 Relay) feature.

Figure 8:
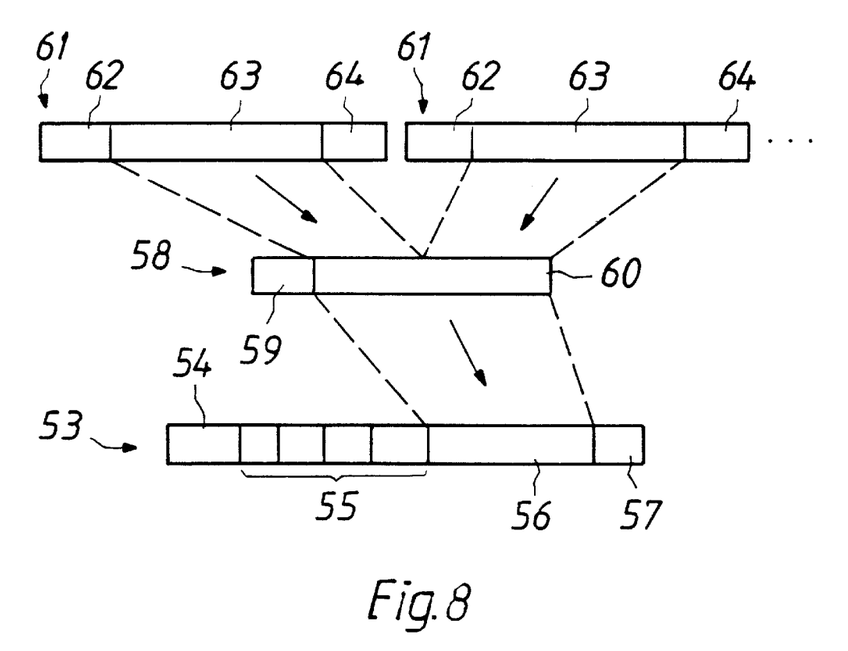
FIG. 8 shows the stripping away of the RLP control from the radio telephone network's data frames that have been transferred from a Mobile Station, the stripping serving to form data packets in accordance with the data communications protocol, and the extraction of the data from these data packets to form data packets used by the LAN.

The IP data packets 58 contained in the RLP frames 81 in the GSM radio telephone network are sent from the mobile phone 16 or an equivalent radio telephone unit ahead via radio path 18a to base station 8a and from there via Mobile Services Centre 6 to the other base station 8b and from here via radio path 18b to mobile phone 20 of Mobile Station 12 or to an equivalent radio telephone unit, as is illustrated in FIG. 2. Mobile phone 20 receives the IP data packets 58 that are packed into the RPL frames 61 of the radio telephone system and they are transferred via data adapter 21 to the actual Mobile Station 12, ie, to a portable personal computer. In data adapter 21 the data blocks 63 are extracted from the data frame of the radio telephone system, such as from GSM/RLP frame 61, which data blocks 63 contain a data packet 58 according to the data communications protocol that is used, such as the IP protocol, as is illustrated in FIG. 8. These data packets 58 are then fed to portable computer 12, which uses its data communication program to strip these data packets 58 in accordance with the data communications protocol and thus receive the incoming data stream.

Figure 9:
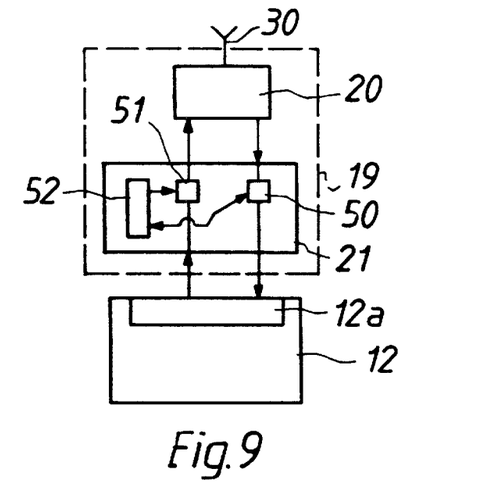
FIG. 9 is a block diagram showing the data interface unit connected to a Mobile Station.

Mobile phone 20 and data adapter 21 together form a data interface unit 19 of the Mobile Station 12, as is illustrated in FIG. 9. In terms of its function and structure, this data interface unit 19 corresponds to data interface unit 15 of the LAN according to FIG. 6a and the same structural parts are marked with the same reference numbers. Data interface unit 21 is connected via an appropriate input/output interface 12a to Mobile Station 12.

Figure 10:
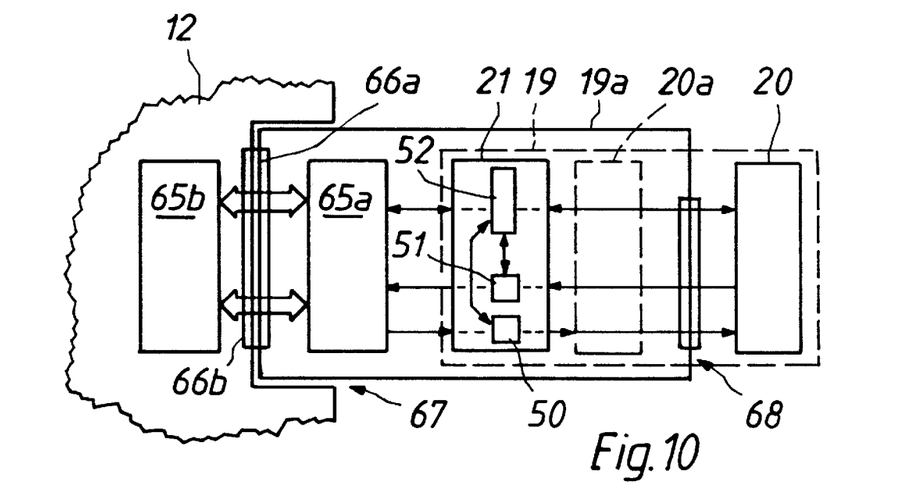
FIG. 10 shows the other data interface unit implemented on a PCMCIA card.

Data adapter 19 is advantageously implemented as a PCMCIA card 19a, as is shown schematically in FIG. 10. PCMCIA card 19a is fitted with service unit 65 A, which is connected to the PCMCIA card connector, and with the first connector strip 66a. PCMCIA card 19a is seated in PCMCIA card slot 67, which resides in the host unit, ie, in Mobile Station 12. PCMCIA card slot 67 incorporates a second connector strip 66b to which the first connector strip 66a of card 19a can be connected. Mobile Station 12 furthermore includes PCMCIA service unit 65b by mans of which card 19a and the PCMCIA connector is interfaced to Mobile Station 12. Mobile Station 20 is connected by means of connector cord and interface 68 to PCMCIA card 19a and data adapter 19.

It should be noted that PCMCIA card 19a can also be fitted with mobile telephone unit 20a, which corresponds to mobile phone 20, as is shown with a dashed line in FIG. 10. In this case mobile phone 20 or its interface 68 are not needed at the end of PCMCIA card 19a and it can be omitted. Now PCMCIA card 19a is structurally identical to PCMCIA card 28, which was described previously in connection with FIG. 6b. Accordingly, the same PCMCIA card 19a, 28 can be used in the PCMCIA card slot in connection with both Mobile Station 12 and LAN-controller 14. This simplifies assembly of the data transfer system and lowers production costs, both of which result in benefits to the user.

As can be noted from the above-presented description of an embodiment in accordance with the invention, a digital radio telephone network offers a fully transparent connection between a Mobile Station 12 and a LAN 1. Data interface unit 15 of LAN 1 and data interface unit 19 of Mobile Sin 12 (FIGS. 2, 6a and 9) receive the data communications data packets that are packed into RPL data frames of the radio telephone network 6 in accordance with the data communications protocol. in both data interface units 15, 19 the data packets coming from radio telephone network 6 are checked and if any errors appear, a retransmission is requested. If the data packets are error-free, they pass through radio telephone unit 16a, 20 and they are stored in buffer memory 50 of data adapter 17, 21. When one or more of the radio telephone network's data frames containing the data communications data packet are received, the data communications data packet is stripped and its data content is stored in buffer memory 50 of the LAN's data interface unit 15, from where it is transferred to LAN-controller 14, in which it is packed into a LAN data packet and sent ahead from here to be delivered to Its destination in LAN 1. Similarly, the data communications data packets that have been received at Mobile Station 12 are stripped in data interface unit 19 and the data content is stored in buffer memory 50, from which It is read via input/output interface 12a to Mobile Station 12. Accordingly, data interface 15, 19 according to the invention, with its peripheral devices 14, 12a, functions as a normal LAN node end its operation is controlled by conventional LAN software. It should be noted that because the bit rates of LAN networks are generally considerably greater than the bit rates of radio telephone networks, the LAN-connected data interface unit according to the invention can process several simultaneous radio telephone connections provided that several radio telephone units 16a, 20 and/or mobile phones, 16, 20 are connected to this data interface unit. It has been discussed above that the data communications data packets in accordance with the data communications protocol (IP data packets) are transferred over a digital radio telephone network in compliance with the RLP communications procedure. whereby the transfer is non-transparent because the data to be transferred is chocked and a request for its retransmission may be made. Alternatively, the data communications data packets can be transferred over the digital radio telephone network in a transparent manner without the possibility of making use of error checking and correction service that may be offered by the radio telephone network. With this method the raw data can be transferred at a rate of 12 kbit/s. This enables a greater data transfer rate to be achieved than when conforming to the RLP protocol. When a data transfer method of this kind is selected, a serial protocol may be used between the mobile station and the data interface unit connected to the LAN by means of which data transfer errors from end to end are corrected. An appropriate serial protocol is, for example, a transfer procedure of the HLDC type (High Level Data Link Control), which is common in packet-switched data transfer. If the radio path is good, transparent data transfer implemented by means of a serial protocol may give, with respect to the RLP protocol, a faster data transfer connection between the Mobile Station and another station or the equivalent that is connected to the LAN.

Figure 11:
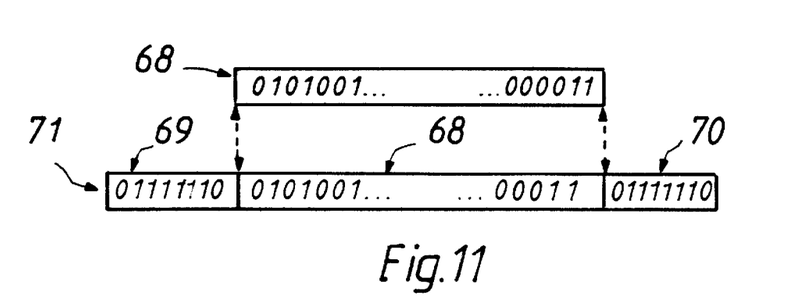
FIG. 11 shows the insertion of the LAN's data packet into a frame unit marked with flags of the radio telephone network.

FIG. 11 illustrates a method of data transfer according to the immediately foregoing method presented above. In a Mobile Station such as station 12 in FIG. 2, the data communications data packets are assembled in a manner that is known per se making use of common data communications software. The data communications data packet is, for example, a data packet 68 according to the IP protocol. This data packet 68 is fed in this case as an integral whole that is inserted into data frame 71 from data interface unit 19 of Mobile Station 12 over the radio path opened by radio telephone network 6 to data interface unit 15 of LAN 1 using the HDLC protocol. Data frame 71 in formed by setting at the start of data packet 68 the first flag 69, which indicate the start of the data frame, and at the end of data packet 68 a second flag 70 is added, which indicates that the data frame has ended. The flags 69, 70 are formed from a group of bits such as an eight-bit word. Data packet 68 is framed with flags 69, 70 in data interface part 19 of Mobile Station 12. Data packet 68 is stored first in buffer memory 51 of data adapter 21, from which it is transferred under the control of controller 52, which has the flags 69, 70, to mobile phone 20 and on to the radio path. Data packet 68, which has flags 69, 70, is received by mobile phone 16 of the LAN's data interface unit 15. The RLP control is stripped away and data frame 71 is stored first in buffer 50 of the data adapter 17, from which data packet 68 between flags 69, 70 is then sent ahead under the control of controller 52 via LAN controller 14 to LAN 1 and the Mobile Station or other similar device that is connected to it. In a similar manner, when it is desired to send data to Mobile Station 12 via LAN 1 and the data transfer device 13 connected to it, data packet 68 is fed via LAN-controller 14 to data adapter 17 of data interface unit 15 and in particular to its buffer memory 51, in connection with which it is provided with flags 69, 70 by means of controller 52 and after which data frame 71 is sent via mobile phone 16, 16a to the radio path and on to the other mobile phone 20 and Mobile Station 12. The stripping of data frame 71 of the radio telephone network takes place in the above-described manner. The data frames 71, which are ready for sending in mobile phone 16, 16a; 20, 20a, ie, data packets 68 which have the flags 69, 70, are proceed as a bit stream which is sliced as needed and in an appropriate manner into the standard data frames used in a radio telephone network. Similarly, the standard data frames received by mobile phone 18, 16a; 20, 20a are stripped down into a bit stream from which the above-mentioned transmitted data frames 71 are separated out.

It should be noted that the structure and composition of data interface units 15, 19 is essentially the same when using both data frames 61 (FIG. 7) under the regime of the digital radio telephone network RPL protocol and data frames 71 (FIG. 11) that are provided with flags. The control programs used in implementing the applications naturally differ somewhat from each other.

Various alternative data compression methods can be used to improve the throughput of the radio telephone network. In these cases both the Mobile Station and the LAN's data interface unit must be equipped with the same kind of data compression equipment. All the data which is contained in one data frame of the radio telephone system is compressed in the protocol controller of the Mobile Station and similarly it is decompressed in the LAN's data interface unit before it is fed to the radio telephone network and, similarly, to the LAN.

It should be noted that various kinds of software can be applied in connection with the method according to the invention and the data interface unit and that their use and selection depends on the user and on the protocols supported by the LAN.

The above invention is described primarily with reference to one of its preferred embodiments, but it is clear that the invention can be applied in many different ways within the purview of the invention defined in terms of the accompanying claims.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A method of transferring information directly to and from a local area network (LAN) using a radio telephone network, comprising the steps of:

transferring a LAN information packet to an adapter that is connected to said LAN, said information packet having a first structure, said first structure including a data portion and a control portion; said first structure being predetermined for use in said LAN;

stripping said control portion of said information packet and extracting said data from said packet;

converting said extracted data into a second data structure that is predefined for use by said radio telephone network; transferring the data in said second data structure to a first radio telephone that is coupled to the radio telephone network; and transmitting said converted data to a base station of the radio telephone network, using said first radio telephone, for reception by a second radio telephone.

2. A method according to claim 1, wherein said second structure is a radio link protocol data frame for the radio telephone network.

3. A method according to claim 2, wherein said data frames of the second structure are data frames of a time-divided digital radio telephone network.

4. A method according to claim 1, wherein said second data structure is configured in accordance with a data communications protocol.

5. A method according to claim 1, wherein the second data structure is formed by means of flags, the first flag of which is set at the start of the data to indicate the start of the data, the second flag being added to the end to indicate the end of the data.

6. A method of transferring information directly to and from a local area network (LAN) using a radio telephone network, as described in claim 1, further comprising the steps of:

receiving an information packet in said adapter having said second data structure via said first radio telephone;

stripping a control portion, predefined for use by said radio telephone network, and extracting data from said received information packet in said adapter;

converting said extracted data into said first data structure predefined for use by the LAN, and outputting said received information packet to the LAN in said first data structure.

7. A method according to claim 6, wherein the second data structure comprises a data frame from the radio telephone network.

8. A method according to claim 7, wherein data frames of the second data structure are data frames of a time-divided digital radio telephone network.

9. A method according to claim 6, wherein the second data structure of the radio telephone network is formed by means of flags, the first flag of which is set at the start of the data to indicate the start of the data, the second flag being added to the end to indicate the end of the data.

10. A data transfer device for direct data transfer between a local area network (LAN) and a radio telephone network, said device comprising:

a LAN controller connected to said LAN for processing information packets from the LAN having a first data structure, including a data portion and a control portion, said first structure being predetermined for use in said LAN;

a radio telephone bidirectionally coupled to said radio telephone network for transmitting and receiving information packets having a second structure, including a data portion and a control portion, said second structure predefined for use by said radio telephone network;

an adapter connected to said LAN controller and coupled to said radio telephone, said adapter constructed to strip said control portion of said information packet and to extract said data portion from said packet, and further to convert said data portion to said second structure for transmission by said radio telephone within said radio telephone network; and wherein said adapter is further constructed to receive information packets from said radio telephone having said second structure, to strip said control portion of said second structure and extract said data portion, and further to convert said data portion to said first structure for processing by said LAN controller.

11. A data transfer device according to claim 10, wherein the extracted radio telephone data frames are converted in accordance with a data communications protocol.

12. A data transfer device according to claim 10, wherein the adapter is implemented on a PCMCIA card.

13. A data transfer device according to claim 10, wherein the PCMCIA card has a connector for a radio telephone.

14. A data transfer device according to claim 10, wherein the data adapter and the radio telephone are implemented on a PCMCIA card.

* * * * *